United States Patent [19]

Koschmieder et al.

[11] Patent Number: 4,886,482

[45] Date of Patent: Dec. 12, 1989

[54] NOVEL TENSIONING DEVICE

[75] Inventors: Hartmut Koschmieder; Werner Petri, both of Erlangen, Fed. Rep. of Germany

[73] Assignee: INA Walzlager Schaeffler KG, Fed. Rep. of Germany

[21] Appl. No.: 357,424

[22] Filed: May 25, 1989

[30] Foreign Application Priority Data

Jul. 20, 1988 [DE] Fed. Rep. of Germany ....... 3824645

[51] Int. Cl.$^4$ .............................................. F16H 7/12
[52] U.S. Cl. .................................... 474/133; 474/135
[58] Field of Search ........................ 474/101, 109–111, 474/113–115, 117, 133, 135, 138

[56] References Cited

U.S. PATENT DOCUMENTS

| 4,661,087 | 4/1987 | Henderson | 474/135 |
| 4,822,322 | 4/1989 | Martin | 474/135 |

Primary Examiner—Thuy M. Bui
Attorney, Agent, or Firm—Bierman and Muserlian

[57] ABSTRACT

Tensioning device, particularly a belt tensioning device, for the drive of auxiliary aggregates of an internal combustion engine comprising a swivel arm at one end of which a tension roller for the belt is rotatably mounted and whose other end is plugged by means of a hub onto a journal which is parallel to the axis of rotation of the tension roller and arranged in a fixed pot-shaped housing, a spring whose one end is fixed to the swivel arm and whose other end is fixed to the housing and, arranged in the housing, a friction damping members which produces damping forces of differing magnitude for the swivel arm in the two directions of movement and has a fraction lining lying against the housing wall and acted upon by the swivel arm, characterized in that the friction damping members comprises an inner ring fixed to the swivel arm, an outer ring lying against the friction lining and several rolling elements arranged between these rings and disposed in troughs in the rings for rolling movement along ramps.

12 Claims, 2 Drawing Sheets

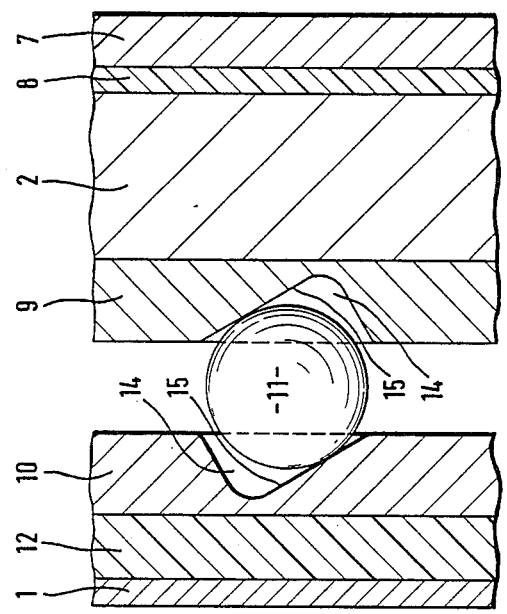
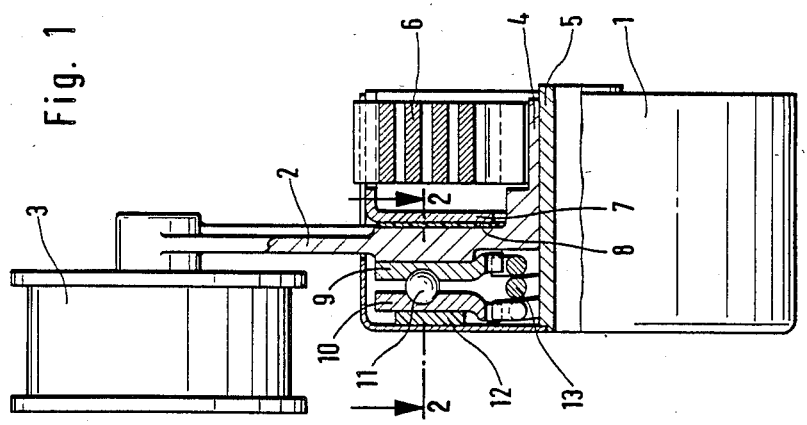

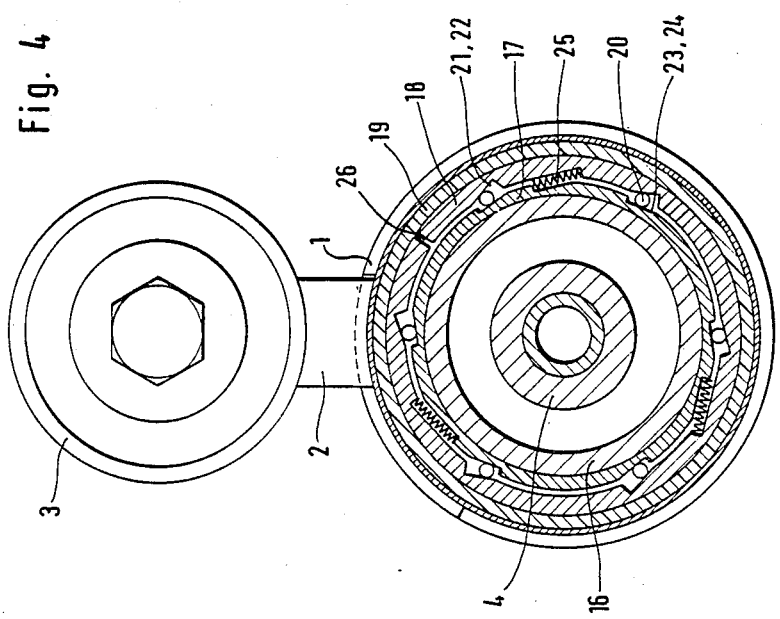
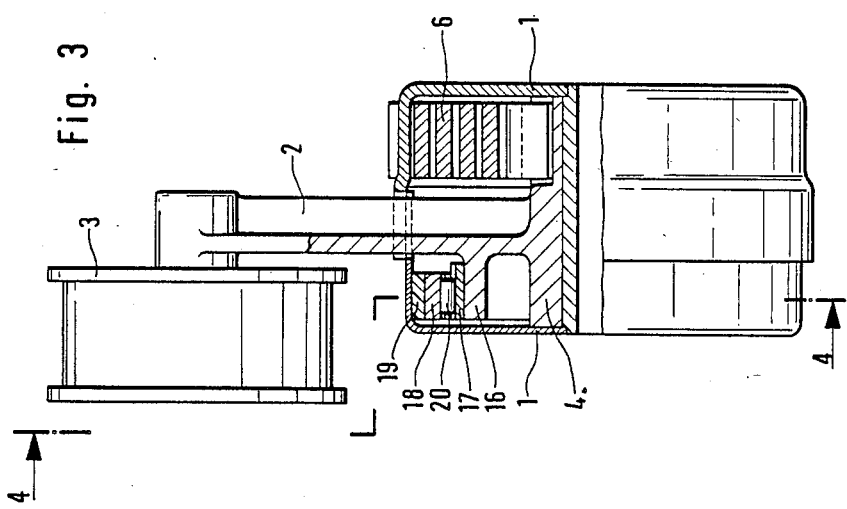

NOVEL TENSIONING DEVICE

STATE OF THE ART

A tensioning device, particularly a belt tensioning device, for the drive of auxiliary aggregates of an internal combustion engine comprising a swivel arm, at one end of which a tension roller for the belt is rotatably mounted and whose other end is plugged by means of a hub onto a journal which is parallel to the axis of rotation of the tension roller and arranged in a fixed pot-shaped housing, a spring, whose one end is fixed to the swivel arm and whose other end is fixed to the housing and, arranged in the housing, a friction damping means which produces damping forces of differing magnitude for the swivel arm in the two directions of movement and has a friction lining lying against the housing wall and acted upon by the swivel arm are known from DE-OS No. 3,637,103. The friction damping means thereof comprises a friction ring arranged between an annular surface of the housing and the hub of the swivel arm and which with one peripheral surface lies against the adjacent construction part. One end of this friction ring is fixed to the other adjacent construction part and friction occurs at that construction part, against which the friction ring lies. When the swivel arm is turned in the one direction, the friction ring is pressed more tightly against the annular contact surface than when it is turned in the other direction which produces the damping forces of differing magnitude of this means.

The known construction has the disadvantage that the friction ring is very sensitive to tolerances and to obtain uniform contact with the friction surface, the diameter of the friction ring has to very exact. Since such a spring, designed as a friction ring, is intended to act like a beam of uniform strength, the thickness of the friction ring has to be varied slightly along its periphery. The manufacture of such a friction ring is technically very complicated and therefore not economical. These disadvantages and the wear of the friction ring have a particularly unfavorable effect on the observance of stipulated friction conditions if the friction ring has only one spring turn.

OBJECTS OF THE INVENTION

It is an object of the invention to provide a tensioning device assembled from the easy-to-manufacture construction parts and which makes a uniform functioning over long operation periods possible.

This and other objects and advantages of the invention will become obvious from the following detailed description.

THE INVENTION

The tensioning device of the invention, particularly a belt tensioning device, for the drive of auxiliary aggregates of an internal combustion engine comprising a swivel arm at one end of which a tension roller for the belt is rotatably mounted and whose other end is plugged by means of a hub onto a journal which is parallel to the axis of rotation of the tension roller and arranged in a fixed pot-shaped housing, a spring whose one end is fixed to the swivel arm and whose other end is fixed to the housing and, arranged in the housing, a friction damping means which produces damping forces of differing magnitude for the swivel arm in the two directions of movement and has a friction lining lying against the housing wall and acted upon by the swivel arm, is characterized in that the friction damping means comprises an inner ring fixed to the swivel arm, an outer ring lying against the friction lining and several rolling elements arranged between these rings and disposed in troughs in the rings for rolling movement along ramps. When the swivel arm swivels in one direction, the rolling of the rolling elements along the ramps causes the inner and the outer ring to be pressed apart leading to an increase of the friction force between the friction lining and the outer ring. When the swivelling movement is in the other direction, the rolling elements can roll back along the ramps into the troughs so that the inner and the outer ring are not pressed apart. Therefore, by this coupling of the swivel arm through the rolling elements to the friction-producing outer ring, friction forces of differing magnitude can be produced in the two directions of swivel.

The friction damping means comprises an additional spring which imposes a torque on the inner ring with respect to the outer ring, which provides a constant partial friction force all the time between the outer ring and the friction lining. Only when the swivel arm moves against the tensioning direction of the belt, is the normal force acting on the friction lining intensified as a result of the rolling of the rolling elements along the ramps and the pressing apart of the outer and the inner ring caused by this leads to an increase of friction damping. This friction damping means therefore permits a direction-dependent intensification of the friction force.

The inner ring, the outer ring and the friction lining can be designed as circular disks surrounding the journal and arranged behind one another in its axial direction with the friction lining being in contact with the bottom of the pot-shaped housing. In this way, an axially acting friction damping means is obtained. Thereby, the additional spring fixed at one end to the inner ring and at the other end to the outer ring can be designed as a helical spring surrounding the journal.

It is also possible to design the inner ring, the outer ring and the friction lining as concentric circular rings surrounding the journal with the friction lining being in contact with the inner peripheral surface of the housing. In this case, a radially acting friction damping means is obtained. Here, the troughs with the ramps for the rolling elements can be arranged in the outer ring which is open by means of a slit and built in under radial pre-tension. This ring which is in contact with the friction lining is then elastic in the radial direction and thus acts at the same time as a spring. Balls or rollers can be used as rolling elements in both, the axial as well as the radial version.

REFERRING NOW TO THE DRAWINGS

FIG. 1 illustrates a tensioning device with axially acting friction damping means, partly in axial section;

FIG. 2 is an enlarged detail along the line II—II of FIG. 1.

FIG. 3 illustrates a tensioning device with a radially acting friction damping means, partly in axial section;

FIG. 4 is the tensioning device with radially acting friction damping means seen along the line IV—IV of FIG. 3.

In FIGS. 1 and 2, a tensioning device of the invention comprises a fixed pot-shaped housing 1 in which a swivel arm 2 is mounted at one of its ends for swivelling movement between two limiting stops. At the end of the swivel arm 2 located outside the housing 1, a tension roller 3 for a belt, not shown, is rotatably mounted around an axis parallel to the swivelling axis of the swivel arm. The swivel arm is mounted within the housing with the help of a hub 4 which is plugged onto a fixed journal 5 of the housing.

There is a spring 6 within the housing which in this case is a helical spring but which can also be another type of spring One end of the spring 6 is fixed to the hub 4 of the swivel arm and the other end to the housing 1. The spring effects the repositioning of the tension roller 3 slewed out by the belt. The space for the spring 6 in the housing 1 is limited by an intermediate bottom 7 against whose side away from the spring 6, the swivel arm is propped through a friction lining 8.

The friction damping means of the tensioning device comprises an inner ring 9, an outer ring 10, rolling elements 11 arranged between them, a friction lining 12 and an additional spring 13. The inner ring 9, the outer ring 10 and the friction lining 12 are designed as circular disks. The inner ring 9 is fixed within the housing 1 to the side of swivel arm 2 away from the friction lining 8. One side of the friction lining 12 is in contact with the bottom of the housing 1 and the other side is in contact with the outer ring 10. The additional spring 13 is a helical spring and surrounds the journal 5 and one end of this additional spring is fixed to the outer ring 10 and the other to the inner ring 9.

Both, in the inner ring 9 as well as in the outer ring 10, troughs 14, delimited in part by ramps 15, are arranged for each rolling body 11, which in this case is a ball. Each ramp 15 is arranged at an inclination to the end face of the inner ring 9 and the outer ring 10 respectively. The ramps 15 of two troughs 14 for a rolling body 11 are arranged face-to-face with one another so that when the rings 9 and 10 turn relative to each other, the rolling element 11 can roll simultaneously along both ramps 15 whereby the distance between the rings 9 and 10 changes.

When the swivel arm 2 is swivelled, the movement of the inner ring 9 is transmitted via the rolling elements 11 and the additional spring 13 to the outer ring 10 which glides along the friction lining 12 where the friction damping is caused. When the swivel arm is moved in a direction opposite to the tensioning direction of the belt, the rolling elements 11 roll to the outer ends of the ramps 15 which causes the rings 9 and 10 to be axially pressed apart. By this, the normal force acting on the friction lining 12 is increased and with it, the friction damping effect. When the swivel arm moves in the opposite direction, the rolling elements 11 can roll back along the ramps 15 into the troughs 14. In this case, the normal force acting on the friction lining 12, and consequently also the friction damping effect, is smaller.

The tensioning device of FIGS. 3 and 4 is of similar design so that the same reference numbers have been used for similar parts in FIGS. 1 and 2. However, the difference lies in its radially acting friction damping means which comprises several rings concentrically surrounding the hub 4, viz., a support ring 16 formed on the swivel arm 2, on which support ring an inner ring 17 is fixed, an outer ring 18 and a friction lining 19 which lies against the inner peripheral surface of the housing 1. Cylindrical rolling elements 20 are arranged between the inner ring 17 and the outer ring 18 and disposed in troughs 21 of the outer ring 18 with ramps 22 and in troughs 23 of the inner ring 17 with ramps 24, respectively. The outer ring 18 whose outer surface is in contact with the friction lining 19 is open at one point of its periphery by means of a slit 26 so that it is elastic in the radial direction and it can thus be built in under pre-tension and acts as a spring.

In addition, the inner ring 17 and the outer ring 18 are provided with corresponding recesses in which springs 25 are arranged, each spring being propped at one end against the inner ring 17 and at the other against the outer ring 18. This permits a relative turning movement between the inner ring 17 and the outer ring 18, whereby by the rolling of the rolling elements 20 along the ramps 22 and 24 the radial distance, and with its the ensuing friction force is increased or decreased depending on the turning direction.

The movement of the swivel arm 2 is transmitted by the inner ring 17 via the rolling elements 20 to the outer ring 18 which glides along the friction lining 19 in the circumferential direction and thus produces the friction damping effect. When the swivel arm 2 moves in a direction opposite to the tensioning direction of the belt, the rolling elements 20 roll in the troughs 21 and 23 to the outer ends of the ramps 22 and 24 and thus bring about a radial widening of the outer ring 18. This increases the force with which the outer ring 18 is pressed against the friction lining 19 so that the friction damping effect is also increased. Such a widening does not occur when the swivel arm 2 is swivelled in the other direction because the rolling elements 20 then roll back into the troughs 21 and 23.

Various modifications of the device of the invention may be made without departing from the spirit or scope thereof and it is to be understood that the invention is intended to be limited only as defined in the appended claims.

What we claim is:

1. Tensioning device, particularly a belt tensioning device, for the drive of auxiliary aggregates of an internal combustion engine comprising a swivel arm at one end of which a tension roller for the belt is rotatably mounted and whose other end is plugged by means of a hub onto a journal which is parallel to the axis of rotation of the tension roller and arranged in a fixed pot-shaped housing, a spring whose one end is fixed to the swivel arm and whose other end is fixed to the housing and, arranged in the housing, a friction damping means which produces damping forces of differing magnitude for the swivel arm in the two directions of movement and has a friction lining lying against the housing wall and acted upon by the swivel arm, characterized in that the friction damping means comprises an inner ring fixed to the swivel arm, an outer ring lying against the friction lining and several rolling elements arranged between these rings and disposed in troughs in the rings for rolling movement along ramps.

2. A tensioning device of claim 1 wherein the friction damping means comprises an additional spring which imposes a torque on the inner ring with respect to the outer ring.

3. A tensioning device of claim 2 wherein the inner ring, the outer ring and the friction lining are designed as circular disks surrounding the journal and arranged behind one another in its axial direction, the friction lining being in contact with the bottom of the housing.

4. A tensioning device of claim 1 wherein the inner ring, the outer ring and the friction lining are designed as circular disks surrounding the journal and arranged behind one another in its axial direction, the friction lining being in contact with the bottom of the housing.

5. A tensioning device of claim 4 wherein the additional spring, fixed at one end to the inner ring and at the other end to the outer ring, is designed as a helical spring surrounding the journal.

6. A tensioning device of claim 1 wherein the inner ring, the outer ring and the friction lining are designed as concentric circular rings surrounding the journal, the friction lining being in contact with the inner peripheral surface of the housing.

7. A tensioning device of claim 6 wherein the inner ring is fixed to a support ring of the swivel arm, which support ring concentrically surrounds the hub.

8. A tensioning device of claim 7 wherein one set of troughs with ramps for the rolling elements, are arranged in the outer ring which is open by means of a slit and which is built in with radial pre-tension and another set of troughs with the ramps are arranged in the inner ring.

9. A tensioning device of claim 6 wherein one set of troughs with ramps for the rolling elements, are arranged in the outer ring which is open by means of a slit and which is built in with radial pre-tension and another set of troughs with the ramps are arranged in the inner ring.

10. A tensioning device of claim 1 wherein the inner ring and the outer ring are provided with corresponding recesses whereby a spring acting on the rings is arranged in each recess of the inner ring and the corresponding recess of the outer ring.

11. A tensioning device of claim 1 wherein the rolling elements are rollers.

12. A tensioning device of claim 1 wherein the rolling elements are balls.

* * * * *